July 16, 1963

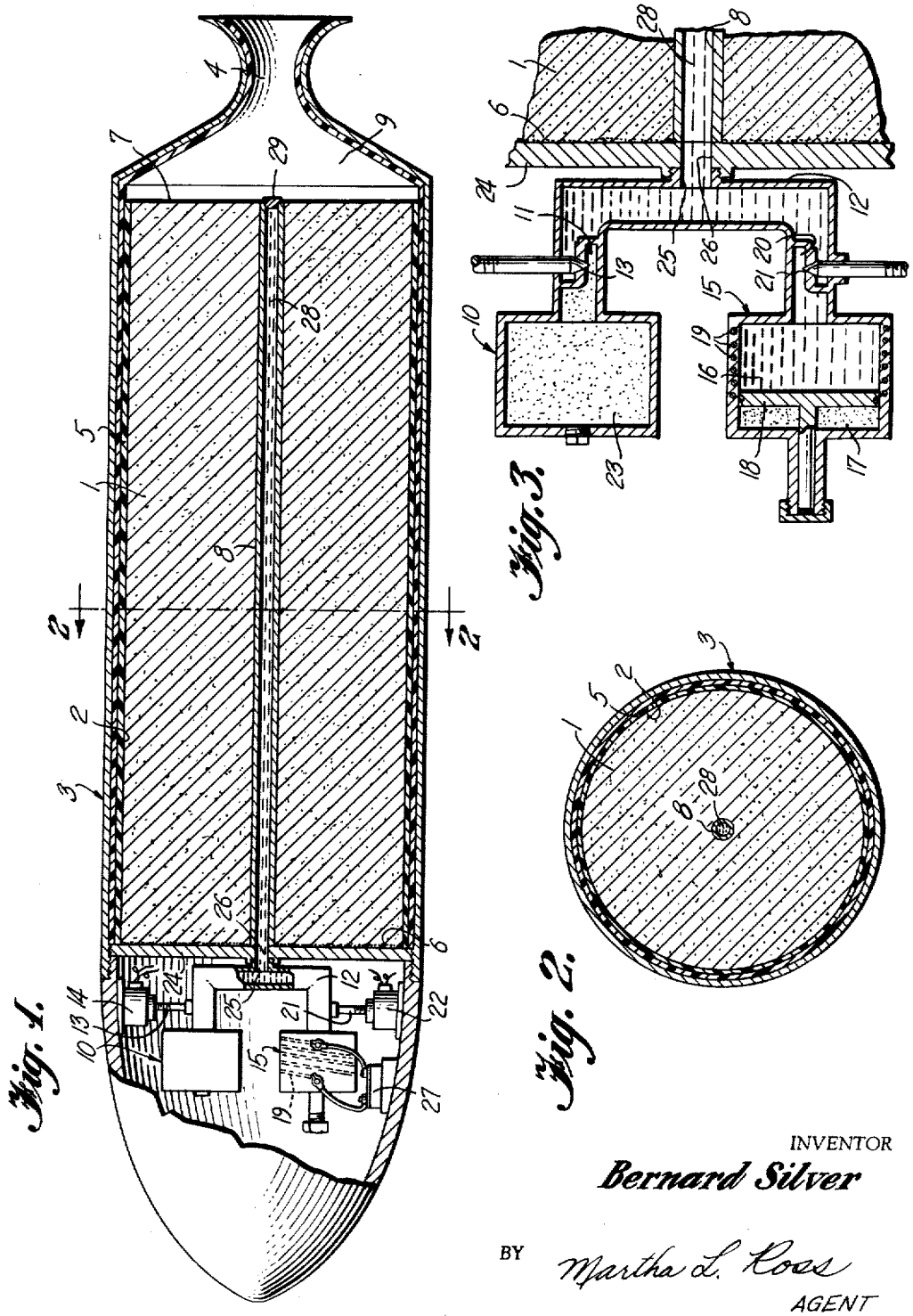

B. SILVER 3,097,481

PROPELLENT GRAINS

Filed Nov. 24, 1959

INVENTOR
*Bernard Silver*

BY *Martha L. Ross*

AGENT

July 16, 1963          B. SILVER          3,097,481
PROPELLENT GRAINS
Filed Nov. 24, 1959          3 Sheets-Sheet 3
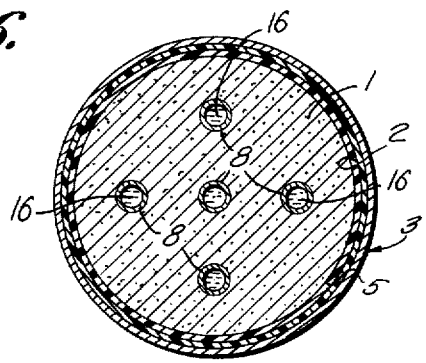
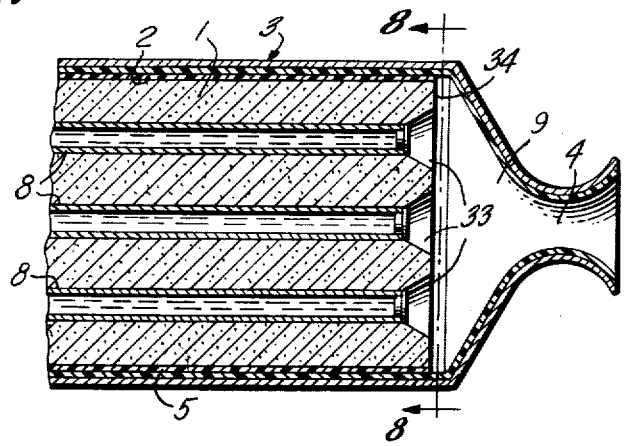
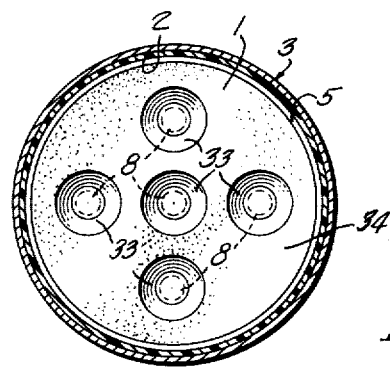
INVENTOR
*Bernard Silver*
BY *Martha L. Ross*
                 AGENT

United States Patent Office 3,097,481
Patented July 16, 1963

3,097,481
PROPELLENT GRAINS
Bernard Silver, Alexandria, Va., assignor to Atlantic Research Corporation, Fairfax County, Va., a corporation of Virginia
Filed Nov. 24, 1959, Ser. No. 855,240
9 Claims. (Cl. 60—35.6)

This invention relates to new and improved propellent grains, the mass burning rate of which can be controllably varied during burning, with concomitant controlled variation of mass rate of gas generation and thrust.

It is well-known that one of the factors determining mass rate of gas generation and thrust at any given point in the burning cycle of a propellent grain, is the area of burning surface at that point. Since a propellent grain, once made, is fixed in shape, any controlled variation in mass rate of gas generation or thrust desired after ignition has had hitherto to be preprogrammed and built into the grain as, for example, by complex designing. Once built into the grain, the prescheduled changes are fixed. Any further change desired during the burning cycle has required the adjustment of other factors, such as varying effective nozzle throat area, the wasteful side dumping of some of the combustion gases, or turning rocket motor nozzles to an angle which reduces the vector producing forward thrust. A similar situation exists in the case of propellent grains designed to give substantially constant burning surface area during the burning cycle of the grain. The mass rate of gas generation and, consequently, thrust, is predetermined and fixed by the shape of the grain and the linear burning rate of the propellent composition in combination with other factors, such as the design of the motor.

In many instances, it is highly desirable and frequently essential that performance of the rocket motor be varied during the burning cycle to meet varying conditions, which may or may not be predictable, without requiring reliance on pressure-varying factors, such as wasteful dumping or difficult nozzle controls, which may or may not be available in a given gas generator or motor design. It is often also necessary to compensate for the ambient temperature of the propellant at the point of use. Unscheduled variation in performance can readily be achieved with liquid propellants merely by varying the rate of feed into the combustion chamber. This, in fact, has been one of the important advantages of liquid over solid propellants, since it has hitherto not been practically possible to build into a propellent grain a means for varying its performance in a non-prescheduled manner.

End-burning propellent grains containing embedded therein, in intimate, gas-sealing contact with the propellent matrix, elongated metal heat conductors, such as wires, positioned normal to the plane of the initial ignition surface of the grain and continuously disposed in the direction of flame propagation of the grain, have recently been introduced to the art. Such wired grains have eliminated the disadvantages of prior end-burning grains by greatly increasing burning surface area and, thereby, the effective mass burning rate and mass rate of gas generation to the degree requisite for high performance. The large burning surface area of the wired end-burning grains results from transfer of heat by the metal heat conductor from the hot combustion zone down into the portion of propellent grain in contact with the metal so that the propellent matrix burns at an exceedingly rapid rate along the metal heat conductor, thereby producing involution of the burning surface, with the conductor at the apex of the formed recess. Thus the wired, end-burning grains can now be employed in place of grains having longitudinal perforations or lateral recesses, expedients which are disadvantageous since they reduce grain strength and motor loading capacity.

Wired end-burning grains, like conventional end-burning grains, are generally cylindrical in shape, so that the cross-sectional area is the same throughout the length of the grain. Therefore, once the cone angle at the wire has reached equilibrium and, therefore, remains constant, the burning surface continues to regenerate over a constant area and, unless other conditions, such as pressure in the combustion chamber, are altered by means external to the grain, thrust remains substantially constant.

The object of this invention is to provide, for use in gas-generation devices, end-burning propellent grains containing embedded, metal, heat-conductor tubes continuously and longitudinally disposed in the direction of flame propagation in a plane normal to the initial ignition surface of the grains, which can be modulated to provide controllable variation in mass rate of gas generation during their burning cycles, within relatively wide limits.

Other objects and advantages will become obvious from the following detailed description and the drawings:

In the drawings, in which like parts in the several figures are identified by the same reference characters:

FIGURE 1 is a longitudinal sectional view through a rocket motor showing an illustrative embodiment of the invention.

FIGURE 2 is a cross-sectional view taken on 2—2 of FIGURE 1.

FIGURE 3 is an enlarged detail view of the temperature regulating means shown in FIGURE 1.

Figure 4:
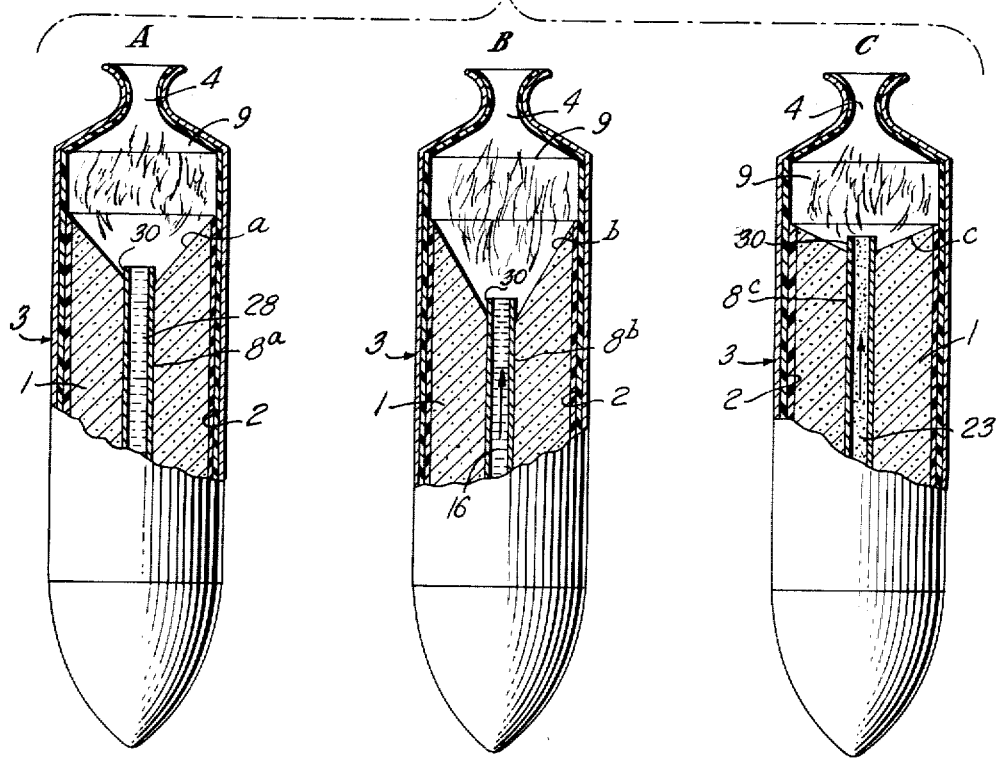

FIGURE 4 comprises a diagrammatic series of longitudinal sectional views showing the effect on mass burning rate of metal heat conductor tubes at different temperatures.

Figure 5:
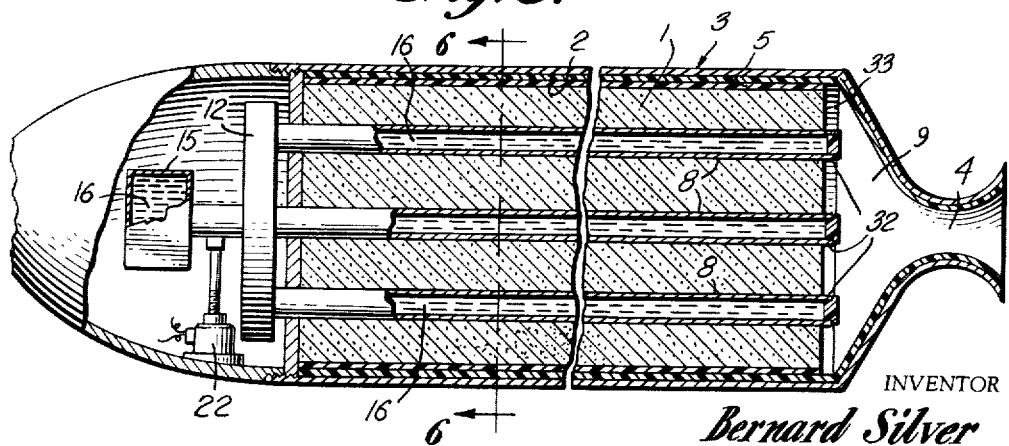

FIGURE 5 is a longitudinal section showing a modification.

FIGURE 6 is a cross section taken on lines 6—6 of FIGURE 5.

FIGURE 7 is a fragmentary longitudinal section of still another modification.

FIGURE 8 is a cross section taken on 8—8 of FIGURE 7.

I have discovered that controllable modulation or variation of the mass burning rate and, thereby, thrust, of an end-burning propellent grain containing longitudinally embedded, elongated metal heat conductors can be effected by employing metal conductors in the form of hollow tubes, and by varying the temperature of such metal tubes relative to the ambient temperature of the propellent matrix during the burning cycle of the propellent grain by passing through the tubes fluids, either liquid or gas, of varying temperature, from the forward end of the grain to the burning surface, whence the fluids vent into the combustion zone. The fluids can be employed either as heating or cooling media for the tubes. The maximum temperature to which the metal tubes are heated should be below the ignition temperature of the particular propellent matrix to avoid internal ignition of the grain.

As aforementioned, the increase in mass burning rate of the grain stems from the increased burning rate of the propellent matrix along the metal heat conductor, which produces involution of the burning surface and, thereby, increased burning surface area. The more rapid the burning along the metal, the more acute is the angle of the recess formed with the metal conductor at the apex, and the greater is the burning surface area, mass rate of gas generation, and thrust. A number of factors influence the rapidity with which the propellent matrix burns along the metal heat conductor, including the linear burning rate of the matrix as determined by its composition; the heat conductivity or diffusivity of the particular metal; the cross-sectional shape and area of the conductor; and the ambient temperature of the propellent matrix. It is a well-known characteristic of propellants in general that the linear burning rate increases with increased ambient temperature of the matrix and decreases with decreasing ambient temperature.

The metal tubes of my invention function, as do wires or metal heat conductors of any other shape, to produce involution of the burning surface of the grain along the tubes and, thereby, an increased burning surface area. The passage of heating or cooling fluids through the tubes serves as a modulating means for varying the burning rate of the grain along the metal conductor.

Heating the tubes by means of the fluid to a temperature above the ambient or environmental temperature of the grain matrix increases the burning rate of the matrix along the tube. Cooling reduces the burning rate. It should be noted, however, that regardless of the temperature change induced in the embedded metal tubes by passage of the fluid therethrough, the tubes continue to function as heat conductors from the high temperature combustion zone into the propellent matrix to produce involution of the burning surface and mass rate of gas generation. It is the degree of such involution and, consequently the total burning surface area, which is controllably varied by changing the temperature of the metal tubes.

The mechanism by which variation in mass burning rate is controllably produced by controllably varying the temperature of the embedded metal conductor has not been definitely established. It appears probable, however, that heating or cooling the conductor relative to the ambient temperature of the propellent matrix effects a similar change in the layer of propellent matrix adjacent to and in intimate contact with the metal tube. This change in temperature changes the linear burning rate of this portion of the matrix, increasing the rate with an increase in temperature and reducing the rate with a decrease in temperature. Where the layer of matrix adjacent to the metal conductor has a higher burning rate because of an increase in its temperature, the burning rate along the wire increases, with accompanying increased degree of involution, burning surface area, mass rate of gas generation, and thrust. Conversely, a decrease in the temperature of the layer of matrix in contact with the metal conductor, decreases the burning rate of this portion of the matrix and decreases the extent of involution of the burning surface along the conductor.

Thus, by providing means for controllably passing fluids at higher or lower temperatures at controlled rates through the heat conductor tubes during the burning cycle, the mass burning rate of the propellent grain can be controllably modulated at will to compensate for conditions met during operation, as for example, during flight of a rocket.

As aforementioned, the fluid employed to modulate the temperature can be a liquid or a gas. In general, a liquid is the preferred medium for effecting an increase in temperature of the metal tube conductor, and a gas is preferred for cooling. The fluids are most conveniently stored in pressurized storage tanks forward of the combustion chamber containing the propellent grain, whence they are controllably fed by means of a suitable valve system through the metal tubes longitudinally embedded in the grain from the forward end of the grain to the combustion zone adjacent to the rearward end of the combustion chamber, e.g., adjacent to the nozzle of a rocket motor.

Since the fluids are employed primarily as a means for heating or cooling, substantially any fluid can be employed for my purpose and, in general, will be chosen for compatibility, temperature properties, e.g., boiling point, and ease of handling in a given application. The choice of a liquid, for example, will be, to a considerable extent, determined by the particular temperature requirements for a given propellent system. Where relatively high heating temperatures are likely to be required, a high boiling point liquid is preferred, such as a paraffin oil, e.g., kerosene; a polyglycol, e.g., diethylene glycol; esters, e.g., dibutyl phthalate, dioctyl sebacate; dibutyl adipate, etc. Lower boiling point liquids, such as water and alcohols, e.g., ethanol, isopropanol, etc., can be used. The high pressure conditions under which the liquids are employed, since they must be moved through the tubes against the high pressure combustion gases in the combustion chamber, operate to increase the effective boiling point of the liquid heating medium.

The liquids can be heated to the desired temperature for use as a heating medium in any convenient manner, as for example, by means of heating elements in or surrounding the tanks in which they are stored forward of the propellent grain, or by filling well-insulated tanks with the heated liquid shortly prior to operation or take-off.

Temperature control by means of the heated fluid medium can be obtained both by regulating its temperature and by varying its rate of flow through the metal tubes, the latter expedient generally being the more practically convenient. Thus the fluid can be maintained in its storage chamber at a certain maximum temperature, and the degree of heat transfer to the metal conductor regulated by the rate at which the heated fluid is passed through the metal tubes. Since internal ignition of the end-burning grain must be avoided, the maximum temperature of the heating fluid during passage through the metal tubes should be such as not to raise the temperature of the metal conductor to the auto-ignition of the propellant. This temperature will, of course, vary with the particular ignition characteristics of the propellent compositions in which the tubes are embedded.

Since a gas cools upon expansion, the use of a compressed gas provides an excellent and convenient coolant means. A suitable gas can be maintained in a storage tank forward of the combustion chamber at a pressure substantially higher than the pressure of the combustion gases in the combustion chamber and can be controllably fed into the metal heat conductor tubes at a rate controlling the degree of gas expansion and, thereby, the degree of cooling. Any convenient gaseous medium can be employed for the purpose, such as air, oxygen, nitrogen, and the like. In some instances the fluid can be in liquid state under the high pressure in the storage tank and vaporize into a gas upon expansion into the metal heat conductor tubes.

The fluid, after passage through the metal tubes, vents into the combustion zone, where it mingles with the gaseous combustion products of the propellant and then vents out the nozzle of the motor. Liquids, of course, vaporize at the high temperature of the combustion zone. The temperature-controlling fluids will normally be employed in such relatively small amounts as not appreciably to affect performance by virtue of their dilution of the combustion gases.

The metal tubes can be of any suitable cross-sectional shape, such as circular, oval, or rectangular. A cylindrical tube is, in general, preferred because of its superior stress-resisting characteristics.

The tubes are preferably made of silver, copper, or aluminum, and can be fashioned from any other metal or metal alloy having good heat conductive properties, such as platinum, tungsten, magnesium, molybdenum, steel, and the like. To a considerable extent, the particular metal used will be determined by the mass burning rate and stress-resisting requirements for a given application.

As aforementioned, the tubing must be in intimate, gas-sealing contact with the propellent matrix along its entire length within the grain. This intimate contact is essential to effectuate control of the burning rate of the matrix by means of the embedded metal conductor. Any spacing of the metal heat conductor from the matrix results only in the establishment of an exposed surface in the interior of the grain which ignites and then burns progressively away from the metal tube in an outward direction normal to the tube at the normal linear burning rate of the propellent matrix. The metal heat conductor, in such a case, would not function to cause involution and an increase in the mass burning rate, mass rate of gas generation, and thrust.

The wall thickness of the tube is largely determined by such factors as the desired mass burning rate, which is influenced by the thickness of the conductor and by the particular operative pressure stresses which must be withstood by the tube. In general, wall thickness will be in the range of about 0.00025 to 0.05 inch, and preferably about 0.0005 to 0.015 inch.

The internal diameter of the tube is not critical. It is desirable, however, that it not be so large as to require unnecessary excessive fluids loading with concomitant excessive dead weight and an uneconomical reduction in propellent loading. In general, a range of 0.005 to 0.6 inch will be adequate for the purpose with the preferred maximum internal diameter being about 0.150 inch.

Before the flame actively propagates along the metal heat conductor tube, a short length of the metal must protrude into the burning zone in order that it be heated to a sufficiently high temperature to provide the necessary heat transfer along its path to effect involution of the burning surface. The length of protrusion varies with different metals and is determined by such factors as the thermal diffusivity and melting point of the particular metal. In general, the higher the thermal diffusivity, the shorter is the length of exposed conductor required before involution occurs. For effective action, therefore, the metal tube must be of sufficient length both to provide for the initial exposure into the flame zone and for propagation of the flame for some distance into the unburned propellant in which it is embedded. In general the minimum length of conductor required to achieve appreciable increase in the mass burning rate is about 0.08 to 0.1 inch and, preferably, about 0.2 inch.

The propellent matrix can be any suitable self-oxidant composition which, upon ignition, burns to produce propulsive gases, such as $CO$, $CO_2$, $H_2$ and $H_2O$. By "self-oxidant" is meant a composition which contains within itself an oxidizing component, such as oxygen, available for combustion of a fuel component of the composition. The propellent matrix can be, for example, of the double base type, such as nitrocellulose gelatinized with nitroglycerine, or of the composite type, such as a mixture of an organic fuel and a finely-divided inorganic solid oxidizer.

The matrix can be a conventional solid propellant or a plastic semi-solid. Cohesive, shape-retentive monopropellent compositions which are characterized as plastic or semi-solid because they flow at ambient or normal temperatures under moderate stress or pressure, can be loaded into the combustion chamber of a gas-generating device or rocket motor, where they function as end-burning grains. Such plastic monopropellent compositions generally comprise a stable dispersion of a finely-divided, insoluble, solid, inorganic oxidizer in a continuous matrix of an oxidizable organic liquid fuel. The physical properties of the plastic monopropellant, in terms of shape-retentive cohesiveness, tensile strength and thixotropy, can be improved by addition of a gelling agent or by using a liquid vehicle of substantial intrinsic viscosity, such as a liquid organic polymer. An example of a semi-solid monopropellent composition suitable for use as an end-burning grain is one consisting of 79.7% $NH_4ClO_4$, 12.1% dioctyladipate, 8.1% polyvinyl chloride (gelling agent), and 0.1% wetting agent, the precentages being by weight.

In FIGURES 1, 2, and 3 of the drawings, for illustrative purposes, propellent grain 1 is shown in the combustion chamber 2 of rocket motor 3, equipped with restricted nozzle 4. The end-burning grain is inhibited on its lateral surfaces by inhibitor coating 5 and on its forward end by plastic cement 6 bonding the grain to forward wall 24 of the combustion chamber. Longitudinally embedded in the grain, normal to initial ignition surface 7, is metal heat conductor tube 8, in intimate, gas-sealing contact with the propellent matrix, and opening rearwardly into the rearward portion 9 of the combustion chamber adjacent to the nozzle.

Forward of the propellant grain and the combustion chamber is storage tank 10 containing a gas 23, such as air or oxygen under pressure which is higher than combustion chamber pressure during the burning cycle of the grain. The storage tank communicates through channel 11 with manifold 12, which, in turn, communicates through channel 25 with embedded metal tube 8 through orifice 26 in wall 24. Passage of the gas into tube 8 is controlled by needle valve 13, which is either closed as shown or opened to the desired degree by conventional, remotely controlled valve actuator means 14.

Storage tank 15 contains liquid 16, such as water or dibutyl phthalate, pressurized by compressed gas 17 acting on piston 18, the pressure maintained being higher than that of the combustion chamber during the burning cycle of the grain. Electrical resistance element 19 in the wall of the tank, powered by battery 27, keeps the liquid at the desired high temperature. Passage of the liquid through channel 20 into manifold 12 and thence into metal tube 8 is controlled by needle valve 21, which is either completely closed as shown or opened to the desired degree by remotely-operated valve actuator means 22.

To avoid internal heating of tube 8 by the combustion gases produced upon ignition of the end-burning surface 7, the tube and manifold 12 can be filled with fluid 28, preferably a liquid, as shown, though it can also be a gas, at any time after assembly of the motor. This can be accomplished, for example, by opening valve 21 (or valve 13) sufficiently to fill the tube and manifold and then closing it. Closure disc 29, preferably made of plastic, such as an epoxy or phenolic resin, which is rupturable under pressure or volatilizes after ignition of the grain, seals the liquid in tube 8 until ignition. If such liquid is at the ambient temperature of tube 8 and the propellant grain matrix, burning rate along the tube is not affected by its presence. If, after ignition, valves 13 and 21 are kept closed, the initially introduced liquid will remain within the tube under the compression produced by the combustion gases in zone 9.

In the embodiment illustrated in FIGURE 1, tube 8 can either be heated by the passage of hot liquid from reservoir 15 at a rate controlled by the valve, or cooled by controlled expansion into the tube and thence into combustion zone 9 of gas from chamber 10. It will be understood that in some applications cooling modulation only or heating modulation only may be required, so that a single storage reservoir either for cooling or heating fluid will be sufficient.

FIGURE 4 illustrates diagrammatically the equilibrium burning surfaces obtained with the same grain, but with different conditions prevailing in the metal heat conductor tube. After ignition of the propellant grain, in all cases, the burning surface involutes along the metal heat conductor tube to form cones a, b, and c, with the metal tube at the apex of recess, as shown. In FIGURE 4A, the fluid storage reservoir valves are closed, so that no fluid is being passed through metal heat conductor tube 8a, which is filled with liquid 28 at ambient temperature of the grain, introduced prior to ignition. The metal tube is thus at the same temperature as the grain matrix, and, at equilibrium burning for the particular grain and motor design, a characteristic cone angle forms, which determines the depth and surface area of the burning surface. Generally, most of the thin metal tube exposed to the hot combustion gases as the burning surface recedes along it, volatilizes or melts, leaving just a short end 30 protruding above the burning surface.

In FIGURE 4B, heated liquid 16 is being passed through tube 8b and vents into the combustion zone where it vaporizes. The metal walls of the tube are heated above the ambient temperature of the propellent matrix; the burning rate along the metal heat conductor tube increases; and a more acute, deeper cone b, of larger burning surface area than cone a, is formed. In FIGURE 4c, gas 23 is expanded into the tube from a storage tank of compressed gas, and after passing through the tube, expands into the combustion zone 9. The metal heat conductor tube is thus cooled below the ambient temperature of the propellent grain matrix, producing a reduced burning rate, a more obtusely angled cone c, and a smaller burning surface area.

In most cases, and, particularly where the propellent grain has a relatively large cross-sectional area, it is desirable to embed a plurality of the metal heat conductor tubes 8 longitudinally at spaced intervals, as shown in FIGURE 5. If a propellent grain contains only a single metal heat conductor, as shown in FIGURE 1, the peripheral portion of unburned propellant remaining when burning has progressed the full length of the metal tube may be larger than is desirable. This can be avoided by introducing a plurality of conductors. FIGURE 5 illustrates an application in which only a heating liquid, stored in tank 15, is employed. The manifold 12 is provided with a plurality of channels 25 in registry with orifices 26 in the rear motor wall 24 and with tubes 8. The spacing of the tubes relative to each other is not critical and is determined by the particular requirements of a given application, the spacing being such as to provide for the desired degree of burning surface involution.

It is also frequently desirable to achieve or approach the equilibrium burning surface, namely the maximum involution produced by the metal heat conductor under particular operating conditions, as quickly as possible. The use of a plurality of conductors, as shown in FIGURE 5, greatly increases the rapidity with which this can be accomplished, since the involutions incident to the metal conductors soon intersect at their flaring ends. Although the apex angle of the recess for each of a plurality of conductors is the same for a single conductor of the same size and shape embedded in a grain, the depth of the recessed cones is shorter in the case of a plurality of conductors, so that overall burning surface is not in actuality increased.

The equilibrium burning state can also be approached more rapidly by exposure of the metal heat conductor tubes a short distance beyond the initial ignition surface as shown at 32 in FIGURE 5, or by prerecessing the initial ignition surface with the end of the tube exposed at the apex of the recess, as illustrated by coned recesses 33 in initial ignition surface 34 in FIGURES 7 and 8.

As aforedescribed, upon ignition, the grain burns for a short distance at the normal rate of the propellent material itself until a short length of the metal protrudes into the hot combustion gas zone, before the flame propagates along the metal heat conductor tube. Initial protrusion of the conductor, therefore, more quickly initiates the desired rapid flame propagation.

Prerecessing of the ignition surface also eliminates at least a portion of the progressivity produced when the burning surface regenerates from an initial plane ignition surface to its maximum involuted state along the metal tube.

The embedded metal heat conductor tubes make possible increases in effective burning rate which are as much as 3 to 5 times larger than that of the propellent matrix itself. Variation in effective or mass burning rate and, thereby, thrust modulation can be varied in a given propellent grain within the range determined by the maximum rate obtainable by heating the tubes to the maximum practical degree by passage therethrough of heated fluid, and the minimum rate obtainable by cooling the tubes, such variation being accomplished at will during the burning cycle of the grain by controlled passage of the heating or cooling fluids through the tubes. It will be understood that controlled passage of the temperature-controlling fluids can be maintained at controlled rates throughout the burning cycle of the grain or only during a portion of the burning cycle at any point or points in the cycle when conditions require a change in the mass rate of gas generation.

It is recognized that the system of my invention involves an increase in dead load. This, however, can generally be maintained within practical limits, especially where the modulated propellent grain is relatively large, since the amounts of fluid normally required are small, particularly where tubes of minimum internal diameter and wall thickness are employed, and since the fluid storage chambers and the actuating and controlling means can be maintained outside the combustion chamber and, therefore, outside the sphere of the high temperature, corrosive combustion gases, thereby making possible the use of strong but light-weight structural materials.

Although the invention has largely been described in terms of rocket motor application, it can effectively be used in any gas-generating device employing a propellent grain as a source of propulsive gases, as, for example, in catapult launchers or turbines. In such applications, it should be noted, the weight of the temperature-modulating means is of no practical consequence.

I claim:
1. A propellent grain, said grain being designed to burn continuously from one end which is an initial ignition surface and comprising a self-oxidant propellent matrix, the combustion of which generates propellent gases, said matrix containing embedded therein an elongated metal heat conductor tube positioned substantially normal to the plane of said initial ignition surface of said grain and extending continuously in the direction of flame propagation for the entire length of said grain, the entire exterior surface of said metal tube lying within the body of the propellent grain being in intimate, gas-sealing contact with the propellent matrix, the maximum wall thickness of the said metal tube being about 0.05 inch and the maximum internal diameter of the tube being about 0.6 inch, said metal heat conductor tube being adapted to serve as a channel for controllable passage therethrough in contact with the interior wall surface of said metal tube, during the burning cycle of the grain, of fluid, which vents out of the burning end of said grain, said fluid being at a temperature different from and, thereby, changing that of said tube.

2. A propellent grain, said grain being designed to burn continuously from one end which is an initial ignition surface and comprising a self-oxidant propellent matrix, the combustion of which generates propellent gases, said matrix containing embedded therein an elongated metal heat conductor tube positioned substantially normal to the plane of said initial ignition surface of said grain and extending continuously in the direction of flame propagation for the entire length of said grain, the entire exterior surface of said metal tube lying within the body of the propellent grain being in intimate, gas-sealing contact with the propellent matrix the maximum wall thickness of the said metal tube being about 0.015 inch and the maximum internal diameter of the tube being about 0.150 inch, said metal heat conductor tube serving as a channel for controllable passage therethrough in contact with the interior wall surface of said metal tube, during the burning cycle of the grain, of fluid, which vents out of the burning end of said grain, said fluid being at a temperature different from and, thereby, changing that of said metal tube.

3. The propellent grain of claim 2 containing a plurality of said elongated metal heat conductor tubes in spaced relationship each to the other.

4. The propellent grain of claim 3 in which one end of each of said metal heat conductor tubes is exposed at the apex of a recess in said initial ignition surface.

5. A gas generator device comprising a combustion chamber, a propellent grain seated therein, said grain being designed to burn continuously from one end which is an initial ignition surface and comprising a self-oxidant propellent matrix, the combustion of which generates propellent gases, said matrix containing embedded therein an elongated metal heat conductor tube positioned substantially normal to the plane of said initial ignition surface of said grain and extending continuously in the direction of flame propagation for the entire length of said grain, the entire exterior surface of said metal tube lying within the body of the propellent grain being in intimate, gas-sealing contact with the propellent matrix, the maximum wall thickness of the said metal tube being about 0.05 inch and the maximum internal diameter of the tube being about 0.6 inch, said metal heat conductor tube serving as a channel for controllable passage therethrough in contact with the interior wall surface of said metal tube, during the burning cycle of the grain, of fluid which vents out of the burning end of said grain, and means, positioned outside of said combustion chamber, for providing said fluid at a temperature below the autoignition temperature of said propellent grain and different from that of said metal tube embedded in said propellent grain, and for passing said fluid through said metal tube at a controllable rate.

6. The gas generator device of claim 5 in which the propellent grain contains a plurality of said elongated metal heat conductor tubes in spaced relationship each to the other.

7. The gas generator device of claim 6 in which the fluid-providing means comprises a storage chamber containing gaseous fluid under higher pressure than the pressure in said combustion chamber during the burning cycle of said propellent grain, communicating means between said storage chamber and said metal heat conductor tubes in said grain, and controllable valve means capable of controlling flow of said gaseous fluid into said metal heat conductor tubes, said gaseous fluid, when flowing through said metal heat conductor tubes serving as a coolant for said tubes.

8. The gas generator device of claim 6 in which the fluid-providing means comprises a storage chamber containing a liquid at a higher temperature than that of the propellent grain and the metal heat conductor tubes embedded therein, communicating means between said storage chamber and said metal heat conductor tubes, pressurizing means for forcing passage of said liquid from said storage chamber through said metal heat conductor tubes, and controllable valve means capable of controlling flow of said liquid into said metal heat conductor tubes.

9. A gas generator device comprising a combustion chamber, a propellent grain seated therein, said grain being designed to burn progressively from one end which is an initial ignition surface and comprising a self-oxidant propellent matrix, the combustion of which generates propellent gases, said matrix containing embedded therein an elongated metal heat conductor tube positioned substantially normal to the plane of said initial ignition surface of said grain and extending continuously in the direction of flame propagation for the entire length of said grain, the entire exterior surface of said metal tube lying within the body of the propellent grain being in intimate, gas-sealing contact with the propellent matrix, the maximum wall thickness of the said metal tube being about 0.05 inch and the maximum internal diameter of the tube being about 0.6 inch, said metal heat conductor tube serving as a channel for controllable passage therethrough in contact with the interior wall surface of said metal tube, during the burning cycle of the grain, of fluid which vents out of the burning end of said grain, and means, positioned outside of said combustion chamber, for providing said fluid at a temperature below the autoignition temperature of said propellent grain and different from that of said metal tube embedded in said propellent grain, and for passing said fluid through said metal tube at a controllable rate.

References Cited in the file of this patent
UNITED STATES PATENTS

| 2,419,866 | Wilson | Apr. 29, 1947 |
| 2,618,120 | Papini | Nov. 18, 1952 |
| 2,816,721 | Taylor | Dec. 17, 1957 |
| 2,958,183 | Singelmann | Nov. 1, 1960 |

UNITED STATES PATENT OFFICE
CERTIFICATE OF CORRECTION

Patent No. 3,097,481                           July 16, 1963

Bernard Silver

It is hereby certified that error appears in the above numbered patent requiring correction and that the said Letters Patent should read as corrected below.

Column 9, line 17, for "0.05" read -- 0.015 --; line 18, for "0.6" read -- 0.150 --.

Signed and sealed this 7th day of January 1964.

(SEAL)
Attest:
ERNEST W. SWIDER

Attesting Officer

EDWIN L. REYNOLDS

Acting Commissioner of Patents